United States Patent [19]

Fitzgerald

[11] 3,843,571

[45] Oct. 22, 1974

[54] GLAMOUR POWDER COATING COMPOSITION CONTAINING AT LEAST TWO DIFFERENT COLORED POWDERS AND REFLECTIVE FLAKES

[75] Inventor: Emerson B. Fitzgerald, Wilmington, Del.

[73] Assignee: E. I. du Pont de Nemours and Company, Wilmington, Del.

[22] Filed: Dec. 20, 1971

[21] Appl. No.: 210,241

[52] U.S. Cl.............................................. 260/17 R
[58] Field of Search................... 260/17 R; 106/290

[56] References Cited
UNITED STATES PATENTS

| | | | |
|---|---|---|---|
| 2,683,668 | 4/1950 | Godshalk | 260/17 R |
| 2,702,255 | 2/1955 | Yaeger | 117/103 |
| 2,839,378 | 6/1958 | McAdow | 106/290 |
| 2,941,894 | 6/1960 | McAdow | 106/290 |
| 3,041,303 | 6/1962 | Nelson | 106/290 |
| 3,429,840 | 2/1969 | Lowe | 260/15 |
| 3,654,198 | 4/1972 | Hood et al. | 260/16 |
| 3,708,321 | 1/1973 | Spieles | 117/17 |
| 3,737,401 | 6/1973 | Tsou et al. | 260/37 R |

FOREIGN PATENTS OR APPLICATIONS

| | | | |
|---|---|---|---|
| 1,259,262 | 1/1972 | Great Britain | |
| 1,906,297 | 8/1970 | Germany | 260/17 R |
| 612,313 | 1/1961 | Canada | 260/17 R |
| 1,989,764 | 9/1964 | Japan | 260/17 R |
| 7,017,399 | 6/1971 | Netherlands | 260/ |

OTHER PUBLICATIONS

G. Wendon, "Paint Manufacture," August 1969, XIX 8, page 265.

"Paint Technology," June 1971, Vol. 35, No. 6, page 43–44.

Chemical Abstracts—Vol. 69, 1968–52984t Zimmt (author).

Matthews, "Maroon Coating Compositions," Abstract of Application, 676 O.G. 889 No. 159,852.

*Primary Examiner*—William H. Short
*Assistant Examiner*—Peter F. Kulkosky

[57] ABSTRACT

The novel powder coating composition comprises finely divided polymer particles having a particle size of 1–75 microns and the composition contains 95.0–99.9 percent by weight of at least two differently colored powder particles that are capable of adhering to one another to form a continuous film; the powder particles consist essentially of 70–99.9 percent by weight of the film-forming binder and 0.1–30 percent by weight of colorant particles; and a coalesced film formed from the colored powder particle of 50 microns in thickness should transmit at least 10 percent of the light of the visible wavelength of 4000–7000 Angstroms; and correspondingly 0.1–5.0 percent by weight of reflective flakes such as aluminum flake or mica flake coated with titanium dioxide to provide the composition with a glamour appearance;

the novel polymer coating composition is particularly useful as an exterior finish for automobiles and trucks.

9 Claims, No Drawings

GLAMOUR POWDER COATING COMPOSITION CONTAINING AT LEAST TWO DIFFERENT COLORED POWDERS AND REFLECTIVE FLAKES

BACKGROUND OF THE INVENTION

This invention is related to powder coating compositions, and in particular to powder coating compositions having improved color and glamour.

Powder coating compositions of epoxy resins are well known as shown in Elbing U.S. Pat. No. 3,039,987 issued June 19, 1962 and blends of epoxy resins with other resins as shown in Flowers et al. U.S. Pat. No. 3,058,951 issued Oct. 16, 1962. Blends of polyester resins have also been used as powder coating compositions as shown in Taylor et al. U.S. Pat. No. 3,382,295 issued May 7, 1968. Pigmented acrylic polymer particles have been utilized as toners for imaging systems as shown in Walkup et al. U.S. Pat. No. 2,638,416 issued May 12, 1953; Insalaco U.S. Pat. No. 2,891,011 issued June 16, 1959 and Clemens et al. U.S. Pat. No. 3,502,582 issued Mar. 24, 1970. However, none of these compositions form a finish that has the depth of color and in particular the metallic glamour appearance which has been provided by acrylic lacquers which are widely used as exterior finishes for automobile and truck bodies.

The novel powder coating composition of this invention provides a finish having an appearance comparable to acrylic lacquer finishes and has an unusual depth of color in particular a metallic glamour or a reflective sparkle.

SUMMARY OF THE INVENTION

The powder coating composition of this invention comprises finely divided particles having a particle size of 1–75 microns; wherein the particles comprise 95.0–99.9 percent by weight, based on the weight of the powder coating composition, of at least two differently colored particles that are capable of adhering to one another to form a continuous film wherein the particles consist essentially of 70–99.9 percent by weight of the film-forming binder and 0.1–30 percent by weight of colorant particles; and when the particles are formed into a film about 50 microns thick, the film transmits at least 10 percent of the light of the visible wavelength of 4000–7000 instroms; and correspondingly 0.1–5.0 percent by weight, based on the weight of the powder coating composition, of reflective flakes such as aluminum flake or mica flake coated with titanium dioxide.

DESCRIPTION OF THE INVENTION

The novel powder coating composition of this invention is formed of at least two differently colored powder particles blended with a reflective flake with the requirement being that these powder particles will adhere to one another and coalesce to form a continuous film when heated to their melt temperature. To accomplish this the powder particles must contain binders which are film-forming and the binder must be cpmpatible so that the differently colored particles will form a continuous transparent film when coalesced.

The colored powder particles contain 70–99.9 percent by weight of a film-forming binder and 0.1–30 percent by weight of colorant particles. Preferably the particles contain 80–95 percent by weight of the film-forming binder and 5–15 percent by weight of colorant particles.

The other important criteria that must be met by the novel powder coating composition of this invention is that when the colored particles without the reflective flakes are formed into a film about 50 microns thick the resulting film should transmit at least 10 percent of the light of the visible wavelength of 4000–7000 Angstroms, preferably 30–99 percent of the light in this wavelength range should be transmitted. The resulting film formed from the novel powder coating composition of this invention is not opaque but translucent and provides the resulting finish with a depth of color. Light transmission can be measured on a conventional spectrophotometer such as a Carry model 11 or model 14 spectrophotometer. Standard calculations well known in the art are used in the above light transmission test.

The film-forming binder utilized in the novel powder coating composition can be a thermoplastic acrylic polymer, a thermosetting acrylic polymer, a polyester, a polyhydroxy polyether polymer, ethylene vinyl acetate, and the like and mixtures of the aforementioned resins.

Thermoplastic Acrylic Polymer Powder Coatings

Thermoplastic acrylic polymer powders can be utilized to form the novel powder coating composition of this invention. These thermoplastic acrylic powders are an intimately mixed blend of the following film-forming constituents:

A. 40–95 percent by weight of an acrylic polymer which is either a homopolymer of an alkyl methacrylate having 1–3 carbon atoms in the alkyl group, a polymer of an alkyl methacrylate having 1–4 carbon atoms in the alkyl group and containing at least 50 percent by weight of methyl methacrylate, a polymer of an alkyl methacrylate and an alkyl acrylate having 1–12 carbon atoms in the alkyl groups and containing at least 70 percent by weight of methyl methacrylate, or a graft copolymer of an alkyl methacrylate and an alkyl acrylate having 1–12 carbon atoms in the alkyl groups;

the acrylic polymer has a number average molecular weight of 20,000–70,000;

B. 0–40 percent by weight of cellulose ester, preferably cellulose acetate butyrate having a butyryl content of 30–60 percent by weight, having a viscosity of 0.1–12 seconds measured at 25°C. according to ASTM–D–1343–56;

C. 5–35 percent by weight of an organic plasticizer;

wherein the film-forming constituents have a melt viscosity below 75,000 poises measured at 160°C. and the resulting powder particles have a glass transition temperature of about 30°–60°C.

These acrylic powders preferably have a particle size of 20–50 microns in diameter and the unpigmented acrylic powder particles preferably have a melt viscosity of 5000–60,000 poises measured at 160°C. and a glass transition temperature of 30°–45°C.

The melt viscosity of the film-forming constituents is measured by heating the unpigmented powder to 160°C. and applying a shear gradient of $10^{-3}$ reciprocal seconds and the viscosity is measured in poises.

The number average molecular weight of the acrylic polymer is determined by gel permeation chromatography using polymethyl methacrylate as the standard.

The acrylic polymer is prepared by conventional solution, emulsion or bead polymerization techniques and by using conventional polymerization catalysts.

The acrylic polymer can be prepared by conventional solution polymerization techniques in which the monomer constituents are blended with solvents and a polymerization catalyst and the reaction mixture is heated to 75°–150°C. for about 2–6 hours to form a polymer that has a number average molecular weight of about 20,000–70,000.

Typical solvents which are used to prepare the acrylic polymer are toluene, xylene, butyl acetate, acetone, methylisobutyl ketone, methylethyl ketone, butyl alcohol, and other aliphatic cycloaliphatic and aromatic hydrocarbons, esters, ethers, ketones, and alcohols, such as are conventionally used.

About 0.1–4 percent by weight, based on the weight of the monomers, of a polymerization catalyst is used to prepare the acrylic polymer. Typical catalysts are ditertiary butyl peroxide, cumene hydroperoxide, azobisisobutyronitrile and the like.

The acrylic polymer can be prepared according to a standard emulsion polymerization in which the monomers, suitable emulsification or suspension agent (surfactants), a free radical catalyst charged into a polymerization vessel containing water. The polymerization is carried out in a closed vessel, and preferably, under an inert atmosphere, utilizing polymerization temperatures of about 20°–90°C. Typical free radical catalysts that can be used are as follows: potassium persulphate, the peroxides, such as hydrogen peroxide, a diazo compound, such as azobisisobutyroamidine hydrochloride or a redox type, such as per sulphate or per sulphite, or mixtures of these catalysts.

The acrylic polymer can also be prepared by suspension or bead polymerization techniques ad disclosed in W. R. Sorenson and T. W. Campbell, *Preparative Methods of Polymer Chemistry*, Interscience Publishers, New York, 2nd Ed. 1968, page 254.

The following are typical monomers that can be used in accordance with the percentages indicated herein to prepare the acrylic polymer of the powder coating composition of this invention: alkyl methacrylates having 1–12 carbon atoms in the alkyl group, such as methyl methacrylate, ethyl methacrylate, propyl methacrylate, isopropyl methacrylate, butyl methacrylate, isobutyl methacrylate, hexyl methacrylate, 2-ethylhexyl methacrylate decyl methacrylate, lauryl methacrylate, and the like; acrylates having 1–12 carbon atoms in the alkyl group, such as methylacrylate ethyl acrylate, propyl acrylate, butyl acrylate, pentyl acrylate, hexyl acrylate, 2-ethylhexyl acrylate, octyl acrylate, decyl acrylate, lauryl acrylate and the like. Any of the aforementioned copolymers can contain 0.1–5 percent by weight of an α, B-ethylenically unsaturated monocarboxylic acid, such as methacrylic acid, acrylic acid, ethacrylic acid and the like. Also, the polymers can contain up to 5 percent by weight of compounds which increase the adhesion characteristics of the polymer, such as a dialkylamino alkyl methacrylate, for example, diethylamino ethyl methacrylate, tertiary butyl amino methacrylate, dimethyl amino ethyl methacrylate acrylamide and the like, or an oxazolidine, such as 3-(2-methacryloxyethyl)-2,2-spirocyclohexyl-oxazolidine and the like.

Graft and block copolymers of an alkyl acrylate and an alkyl methacrylate can also be used. Any of the aforementioned alkyl acrylates and alkyl methacrylates can be used in preparing these graft polymers and allyl methacrylate generally is used to provide the grafting sites for the graft copolymer.

Up to 40 percent by weight, based on the weight of the powder coating composition, of a cellulose ester can be used in the novel composition. Preferably cellulose acetate butyrate having a butyryl content of 30–60 percent by weight and a viscosity of 0.1–12 seconds measured according to ASTM-D-1343-56 is used. In general, the lower the molecular weight of the acrylic polymer the higher viscosity cellulose ester will be required to provide the resulting coating with good physical properties such as appearance and reflow characteristics. With some acrylic polymers small amounts of low viscosity cellulose esters can be used, for example, 0.1–0.2 second viscosity cellulose acetate butyrate. About 5–10 percent by weight of a relatively high molecular weight cellulose ester can be used such as a cellulose acetate butyrate having a 6 second viscosity and a butyryl content of about 45 percent. Particularly useful powders can be prepared using about 20–30 percent by weight of cellulose acetate butyrate having a butyryl content of 35–55 percent by weight and a viscosity of 1–2 seconds. Finishes of these compositions have excellent appearance and reflow characteristics.

Organic plasticizers are used in the novel powder coating composition of this invnetion in the amount of 5–35 percent by weight based on the weight of the powder coating composition. The plasticizer should be chosen to provide the powder particles with the aforementioned glass transition temperature and give the resulting finish a glass transition temperature of 40°–60°C.

Monomeric and polymeric plasticizers can be used in the novel powder coating composition of this invention. Phthalate ester plasticizers in particular the alkyl ester phthalates in which the alkyl group has 2–10 carbon atoms can be used such as diethyl phthalate, dibutyl phthalate, didecyl phthalate, di-2-ethylhexyl phthalate and mixtures thereof, adipate esters such as diisononyl adipate, can also be used.

Polyester resins can also be used as plasticizers. Typical polyesters are, for example, alkylene glycol esters of adipic and benzoic acid such as ethylene glycol adipate benzoate, neopentyl glycol adipate benzoate, ethylene glycol adipate benzoate phthalate and the like. Plasticizers of oil free or oil modified alkyd resins and polyesters and epoxidized soya bean oil can also be used.

Mixtures of the above polymeric plasticizers and monomeric plasticizers can be used such as a mixture of ethylene glycol adipate benzoate and diethyl phthalate, neopentyl glycol adipate benzoate and dibutyl phthalate and the like.

The following blends of film-forming constituents form useful powder coating compositions:

50–70 percent by weight of an acrylic polymer,
15–25 percent by weight of cellulose acetate butyrate,
15–25 percent by weight of an organic plasticizer;

70–80 percent by weight of an acrylic polymer, 5–10 percent by weight of cellulose acetate butyrate, 15–25 percent by weight of an organic plasticizer;

55–75 percent by weight of an acrylic polymer, 20–30 percent by weight of cellulose acetate butyrate, 5–25 percent by weight of an organic plasticizer;

70–90 percent by weight of an acrylic polymer and 10–30 percent by weight of an organic plasticizer;

65–85 percent by weight of an acrylic polymer; 10–20 percent by weight of cellulose acetate butyrate and 5–25 percent by weight of an organic plasticizer; and 70–80 percent by weight of an acrylic polymer and 20–30 percent by weight of an organic plasticizer.

The following are illustrations of preferred powder coating compositions that form high quality finishes:

70 percent by weight of polymethylmethacrylate, 20 percent by weight of di-2-ethyl hexyl phthalate, 6 percent by weight of dibutyl phthalate and 4 percent by weight of ethylene glycol adipate benzoate; the composition has a melt viscosity of 23,000 poises measured at 160°C., and a glass transition temperature of 37°C.; the powder forms an excellent finish that has a blass transition temperature of about 45°C.;

76 percent by weight of a copolymer of an 85/15 methyl methacrylate/butyl methacrylate, 20 percent by weight of di-2-ethylhexyl phthalate, 4 percent by weight of diethyl phthalate; the powder has a melt viscosity of 19,000 poises measured at 160°C. and a glass transition temperature of 35°C.; the powder forms an excellent finish having a glass transition temperature of about 45°C.;

66 percent by weight of polymethyl methacrylate, 4 percent by weight of cellulose acetate butyrate having a butyryl content of 38 percent and a viscosity of 2 seconds, 16 percent by weight of didecyl phthalate, 7 percent by weight of ethylene glycol adipate benzoate and 7 percent by weight of diethyl phthalate; the powder has a melt viscosity of 25,000 poises measured at 160°C., and a glass transition temperature of 35°C.; the powder forms an excellent finish that has a glass transition temperature of about 44°C.;

63 percent by weight of polymethyl methacrylate, 7 percent by weight of cellulose acetate butyrate having a 45 percent butyryl content and a viscosity of 8 seconds, 15 percent by weight of didecyl phthalate, 8 percent by weight of ethylene glycol adipate benzoate and 7 percent by weight of dibutyl phthalate; the powder has a melt viscosity of 23,000 poises at 160°C. and a glass transition temperature of 33°C.; finishes formed from the powder have an excellent appearance and a glass transition temperature of about 42°C.

58 percent by weight of a copolymer of methyl methacrylate/butyl methacrylate 75/25, 24 percent by weight of cellulose acetate butyrate having a butyryl content of 50 percent by weight and a viscosity of 1 second, 1.2 percent by weight of a coconut oil phthalate alkyd resin plasticizer, 13.8 percent by weight of ethylene glycol adipate benzoate plasticizer, and 3 percent by weight of a neopentyl glycol adipate benzoate plasticizer.

Thermosetting Acrylic Polymer Powders

Thermosetting acrylic polymer powders can also be used in the novel coating composition of this invention. These thermosetting acrylic polymer powders are an intimately mixed blend of the following film-forming constituents:

A. 70–95 percent by weight of an acrylic polymer consisting essentially of
1. 30–83 percent by weight of methyl methacrylate,
2. 10–50 percent by weight of a soft constituent which can be either an alkyl acrylate or an alkyl methacrylate having 2–12 carbon atoms in the alkyl groups,
3. 5–20 percent by weight of a hydroxy containing compound that can either be a hydroxy alkyl acrylate or a hydroxy alkyl methacrylate having 2–4 carbon atoms in the alkyl groups,
4. 2–8 percent by weight of an ethylenically unsaturated monocarboxylic acid that has at least 50 percent of the carboxyl groups neutralized with an aliphatic amine that has a boiling point of about 200°–275°C.;

wherein the acrylic polymer has a glass transition temperature of about 40°–70°C. and the polymer has a relative viscosity of 1.05–1.20 measured at 0.5 percent polymer solids at 30°C. in methylethyl ketone;

B. 5–30 percent by weight of an alkylolated melamine formaldehyde having a ratio of —CH$_2$OR groups to —CH$_2$OH groups of at least 5:1 where R is an alkyl group having 1–8 carbon atoms.

These thermosetting acrylic powder coating compositions have powder particles that preferably are 10–75 microns in diameter and have a glass transition temperature of about 40°–60°C.

About 70–95 percent by weight, based on the weight of the film-forming constituents in the powder coating composition, of an acrylic polymer is utilized and preferably about 80–90 percent by weight of the acrylic polymer is used. The acrylic polymer has a relative viscosity of about 1.05–1.20, and preferably, about 1.06–1.10.

The relative viscosity is the value obtained by dividing the efflux time of the solution of the polymer by the efflux time of the solvent used to form the above polymer solution. The efflux times are measured according to the procedure of ASTM–D–445–46–T, Method B, using as the polymer solution 0.5 grams of the polymer dissolved in methylethyl ketone to give 50 cubic centimeters of solution. The efflux times are measured at 30°C. in a standard apparatus sold under the designation of modified Ostwald Viscometer.

The acrylic polymer is prepared by conventional solution, emulsion or bead polymerization techniques and by using conventional polymerization catalysts.

The acrylic polymer can be prepared by conventional solution polymerization techniques in which the monomer constituents are blended with solvents and a polymerization catalyst and the reaction mixture is heated to 55–150°C. for about 2–6 hours to form a polymer that has a weight average molecular weight of about 10,000–50,000.

Typical solvents which are used to prepare the acrylic polymer are toluene, ethyl acetate, acetone, methylisobutyl ketone, methylethyl ketone, ethyl alcohol, and other aliphatic cycloaliphatic and aromatic hydrocarbons, esters, ethers, ketones, and alcohols, such as are conventionally used. Solvents having a boiling point below 100°C. are preferred to facilitate spray drying of the composition to form the novel powder coating composition.

About 0.1–4 percent by weight, based on the weight of the monomers, of a polymerization catalyst is used to prepare the acrylic polymer. Typical catalysts are azo-bis($\alpha$, gamma-dimethyl-valeronitrile), benzoyl peroxide, t-butyl peroxy pivalate, azobisisobutyronitrile and the like. Up to about 5 percent by weight of a chain transfer agent can be used to control molecular weight such as dodecyl mercaptan or benzenethiol.

The acrylic polymer can be prepared by an emulsion polymerization process in which the monomers and an aqueous solution of a free radical catalyst are simultaneously and continuously fed into a polymerization vessel containing water, and a suitable emlusifying agent. The polymerization is carried out in a vessel equipped with a reflux condenser, preferably, under an inert atmosphere, utilizing polymerization temperatures at about 20°–90°C. Typical free radical catalysts that can be used are as follows: potassium persulphate, water-soluble peroxides, such as hydrogen peroxide. A redox type catalyst such as a mixture of ammonium persulfate or sodium bisulfate, is preferred. If a redox catalyst is used, 0.1–5 parts per million of iron, based on the weight of water, in the form of a soluble iron salt such as ferrous sulfate should be added to the reaction mixture. Any active anionic or nonionic surfactant or combination thereof can be used as an emulsifying agent. An ammonium or volatile amine salt of a sulfated or sulfonated surfactant, such as ammonium lauryl sulfate, is preferred.

The acrylic polymer utilized in the thermosetting powder coating composition of this invention contains about 30–83 percent by weight of methyl methacrylate, 10–50 percent by weight of an alkyl acrylate or an alkyl methacrylate or a mixture thereof in which the alkyl groups contain 2–12 carbon atoms, 5–20 percent by weight of a hydroxy alkyl acrylate or methacrylate having 2–4 carbon atoms in the alkyl group and 2–8 percent by weight of an $\alpha$, $\beta$-ethylenically unsaturated monocarboxylic acid.

Typical alkyl acrylates, alkyl methacrylates having 2–12 carbon atoms that can be used to prepare the acrylic polymer are ethyl acrylate, propyl acrylate, isopropyl acrylate, butyl acrylate, isobutyl acrylate, hexyl acrylate, 2-ethyl-hexyl acrylate, nonyl acrylate and lauryl acrylate, ethyl methacrylate, propyl methacrylate, butyl methacrylate, hexyl methacrylate, 2-ethylhexyl methacrylate, nonyl methacrylate and lauryl methacrylate.

Typical hydroxy alkyl acrylates and methacrylates which can be used to prepare the acrylic polymer are 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, and the like.

Typical $\alpha$, $\beta$-ethylenically unsaturated monocarboxylic acids are acrylic acid and methacrylic acid.

One particularly useful type of acrylic polymer contains 60–75 percent by weight of methyl methacrylate, 10–30 percent by weight of alkyl acrylate, 5–12 percent by weight of hydroxyethyl acrylate, and 2–5 percent by weight of methacrylic acid or acrylic acid. Typical acrylic polymers of this type are methyl methacrylate/ethyl acrylate/2-hydroxyethyl acrylate/methacrylic acid, weight ratio 67/23/7/3; methyl methacrylate/ethyl acrylate/2-hydroxyethyl acrylate/methacrylic acid, weight ratio 72/17/7/3; methyl methacrylate/ethyl acrylate/2-hydroxyethyl acrylate/methacrylic acid, weight ratio of 70/20/7/3; methyl methacrylate/butyl acrylate/2-hydroxyethyl acrylate/methacrylic acid in a weight ratio of 70/20/7/3.

In the above acrylic polymers, up to 50 percent by weight of the methyl methacrylate may be replaced with styrene and still form useful polymer compositions. However, methyl methacrylate is the preferred constituent.

About 5–30 percent by weight, based on the weight of the film-forming constituents, of an alkylolated melamine formaldehyde having 1–4 carbon atoms in the alkyl group is used in the novel powder coating composition of this invention. These alkylolated melamine formaldehyde resins are those that are well known in the art and are prepared by conventional techniques in which a lower alkyl alcohol usch as methanol, ethanol, butanol, isobutanol, propanol, isopropanol, and the like, is reacted with the melamine formaldehyde to provide pendent alkoxy groups. The ratio of the $-CH_2OR$ groups to the $-CH_2OH$ groups of the alkylolated melamine formaldehyde should be at least 5:1. R is an alkyl group having 1–8 carbon atoms and is from the lower alkyl alcohol used to prepare the alkylolated melamine formaldehyde.

One particularly preferred melamine used in this composition because of its stability in the powder and since it forms a high quality coating is hexa(methoxymethyl) melamine. "Cymel" 300 is one highly preferred hexa(methoxymethyl) melamine that can be used to form a powder coating composition with excellent resistance to popping.

Up to about 25 percent by weight of the film-forming constituents of the novel powder coating composition of this invention of cellulose acetate butyrate can be used. Preferably, the cellulose acetate butyrate has a butyryl content of 30–60 percent by weight and a viscosity of 0.1–6 seconds measured according to ASTM-D–1343–56. One useful cellulose acetate butyrate that can be used in this invention has a butyryl content of about 35–45 percent by weight and a viscosity of 1–2 seconds. The cellulose acetate butyrate gives the composition flow characteristics and improved gloss. Small amounts of high butyryl containing cellulose acetate butyrates can be used for cratering resistance such as 2 percent by weight of cellulose acetate butyrate having a butyryl content of about 55 percent by weight and a viscosity of about 0.2 seconds.

The thermosetting powder coating composition used in this invention is prepared by neutralizing the acrylic polymer solution or emulsion with an aliphatic amine such that at least 50 percent of the carboxyl groups of the acrylic polymer are neutralized. The aliphatic amine should have a boiling point of about 200°–275°C. Typical aliphatic amines are, for example, 2-dibutylaminoethanol, methyldiethanolamine, diethanolamine, diisopropanolamine, tributylamine and N,N-dimethyldodecylamine. Surprisingly and unexpectedly this partial or complete neutralization substantially eliminates popping in finishes prepared from the novel powder coating composition of this invention. Popping and poor appearance has plagued prior art powder compositions.

After the polymer solution or emulsion is neutralized, the alkylolated melamine formaldehyde is added along with pigments, pigment dispersions and other additives, such as the aforementioned plasticizers, cellulose acetate butyrate, and the like.

The aforementioned organic plasticizers are used in the thermosetting polymer coating composition in amounts of 5–35 percent by weight based on the weight of the powder coating composition. The plasticizer should be chosen to provide the powder particles with the aforementioned glass transition temperature.

Other Powder Coatings

Another particularly useful polymer that can be used in the novel powder coating composition of this invention has a backbone of polymerized ethylenically unsaturated monomers and has ester groups attached directly to its backbone; these ester groups comprise about 10–75 percent of the total weight of the polymer and consist essentially of Ester Group (A)

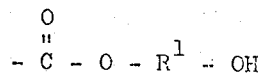

and
Ester Group (B), which is either

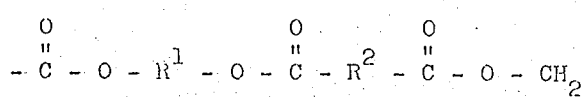 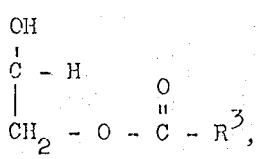

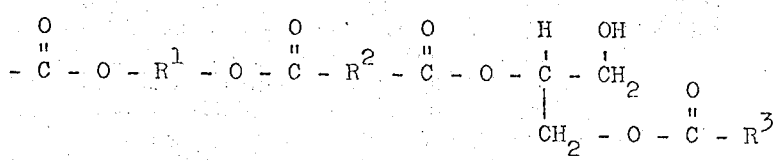 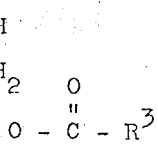

or
a mixture of these groups;
wherein the molar ratio of Ester Group (A) to Ester group (B) is from about 1:1.5 to 1:2.5;
and wherein
$R^1$ is a saturated hydrocarbon radical having 2–10 carbon atoms,
$R^2$ is selected from the group consisting of alkylene, vinylene, aromatic, carbocylic and heterocyclic radicals, and
$R^3$ is selected from the group consisting of a saturated aliphatic hydrocarbon radical having 1 to 26 carbon atoms and an ethylenically unsaturated aliphatic hydrocarbon radical having 12 to 18 carbon atoms.

A wide variety of ethylenically unsaturated monomers can be used to prepare the backbone of the polymer used in this invention. Typical monomers that can be used for the backbone are, for example, vinyl chloride, vinylidene chloride, olefins, such as ethylene, propylene and the like; vinyl acetate, conjugated dienes having 4 to 10 carbon atoms, such as butadiene; aromatic hydrocarbons having vinylene groups, such as styrene, alkyl substituted styrene, such as α-methyl styrene; alkyl maleate, such as dibutyl maleate; vinyl pyrrolidone; acrylic esters, such as acrylonitrile; esters of methacrylic acid and acrylic acid, preferably alkyl esters having 1–12 carbon atoms in the alkyl group, such as methyl methacrylte, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers. Small amounts of ethylenically unsaturated carboxylic acids can also be used in the backbone, such as acrylic acid, methacrylic acid, crotonic acid, itaconic acid, maleic acid and the like.

Particularly useful monomers or combinations of monomers which form the backbone of high quality polymers used in this invention are, for example, styrene, methyl methacrylate, butyl methacrylate, ethyl acrylate, acrylonitrile and vinyl pyrrolidone.

Ester Group (A) of the novel polymer used in this invention is provided by a hydroxyalkyl substituted vinyl addition monomer, such as hydroxyalkyl methacrylate, a hydroxyalkyl acrylate, a hydroxyalkyl maleate, hydroxyalkyl itaconate, or a mixture of these in which the alkyl group contains 2–10 carbon atoms. The hydroxyalkyl monomer is polymerized with the aforementioned backbone monomers.

Preferred hydroxyalkyl monomers used to form the polymer used in this invention are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates or acrylates in which the alkyl groups contain 2–4 carbon atoms.

Ester Group (B) is the esterification product of the aforementioned hydroxyalkyl monomers, an anhydride of a dicarboxylic acid and a glycidyl ester. This ester group is polymerized into the polymer backbone through the ethylenic unsaturation of the aforementioned hydroxyalkyl monomers.

The anhydride used for forming Ester Group (B) has the formula

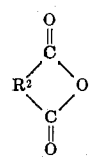

wherein $R^2$ is either alkylene, vinylene, aromatic, carbocyclic or a heterocyclic radical. The anhydride reacts with the hydroxyalkyl monomer and also reacts with the glycidyl ester to form Group (B).

Anhydrides used to form the above polymer in which $R^2$ is an alkylene group are formed from dicarboxylic acids of the general formula $(CH_2)_n(COOH)_2$ where $n$ is from 2-10. Typical dicarboxylic acids of this group are glutaric, adipic, pimelic, succinic acids and the like. The preferred is an anhydride of succinic acid.

Useful anhydrides in which $R^2$ is a vinylene group are derived from dicarboxylic acids of the general formula $$C_n - H_{(2n+4)} - O_4$$

wherein $n$ is from 4-10. Typical dicarboxylic acids of this group are maleic and itaconic acids.

Another group of useful anhydrides are derived from dibasic aromatic acids, such as phthalic acid, uvitic acid and cumidinic acid. Often it is desirable to use a halogen substituted anhydride of one of the above aromatic dicarboxylic acids, such as tetrabromo phthalic anhydride. Halogen substituted anhydrides in which the halogen substitutent is either chlorine, bromine or fluorine are particularly useful in forming fire retardant coating compositions.

Anhydrides in which $R^2$ is a carbocyclic radical are useful, such as hexahydrophthalic anhydride, which has the following formula

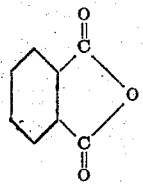

or tetrahydrophthalic anhydride which has the following formula

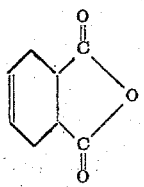

Anhydrides in which $R^2$ is a heterocyclic radical are also useful. One particularly useful compound has the general formula:

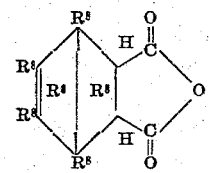

where $R^8$ is either chlorine, bromine or fluorine. The preferred compound is chlorendic anhydride in which $R^8$ is chlorine.

The glycidyl ester used for forming Ester Group (B) has the formula

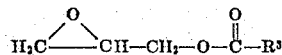

where $R^3$ is a saturated aliphatic hydrocarbon group containing 1-26 carbon atoms, or $R^3$ is an ethylenically unsaturated aliphatic hydrocarbon radical of 12-18 carbon atoms derived from a drying oil fatty acid.

Preferred for use because of the quality of the product obtained are esters where $R^3$ is a tertiary saturated aliphatic hydrocarbon group of the structure

where $R^4$ is $-CH_3$ and $R^5$ and $R^6$ are alkyl groups of 1-12 carbon atoms.

One particularly preferred glycidyl ester of this group because it imparts acid and alkali resistance to the final product is a mixed glycidyl ester described in U.S. Pat. No. 3,275,583, issued Sept. 27, 1966, and is manufactured and sold by the Shell Chemical Company as "Cardura" E ester. This glycidyl ester is of a synthetic tertiary carboxylic acid and has the general formula

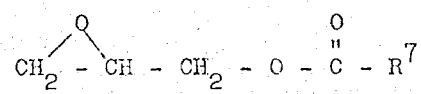

where $R_7$ is a tertiary aliphatic hydrocarbon group of 8-10 carbon atoms.

The preferred method for forming the above unsaturated glycidyl esters is to react the sodium salt of the fatty acid with epichlorohydrin. The reaction is as follows:

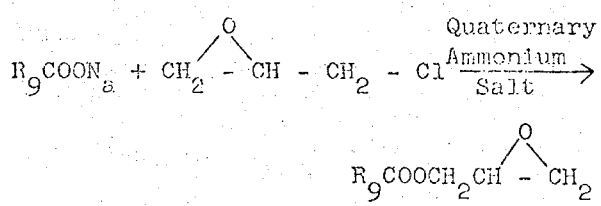

where $R_9$ is from one of the aforementioned drying oil fatty acids.

Preferably, the polymer used in this invention has 30 to 60 percent of its total weight contributed by Ester Group (A) and (B). Also, these groups are present in the polymer at a molar ratio of Ester Group (A) to Ester Group (B) of about 1:1.5 to about 1:2.5, and preferably in a ratio of about 1:2.

One method for preparing the above polymer is to first form Ester Group (B) by reacting in about an equal molar ratio the abofe hydroxyalkyl monomers, the anhydride and the glycidyl ester. This esterification product is then reacted with the backbone monomers and the hydroxyalkyl monomers, which form Ester Group (A), to form the novel polymer of this invention.

As a typical example, a hydroxyalkyl acrylate, aromatic anhydride and a glycidyl ester are charged into a reaction vessel with a suitable solvent, such as toluene, xylene, acetone or an aromatic solvent and the mixture is heated to its reflux temperature, which is about 80° to 200°C., for about 30 minutes to 3 hours. The backbone constituents of the novel polymer, such as styrene/methyl methacrylate and a hydroxyalkyl acrylate with a suitable polymerization catalyst, such as tertiary butyl peroxide, are then slowly added over a 1-4 hour period. The reaction mixture is heated to its reflux temperature which is about 80° to 200°C. for about 30 minutes to 5 hours, preferably 2-4 hours until a polymer is formed that has the desired molecular weight, which is determined by the relative viscosity as described below. Additional solvent may then be added to dilute the polymer solution.

If the reaction rates of the monomer components used to form the polymer used in the invention are suitable, all of the monomers can be charged into a reaction vessel with a suitable solvent and polymerization catalyst and heated to the reflux temperature which is about 80° to 200°C. for 60 minutes to 5 hours.

Another method of preparing the above polymer used in this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1–4 hour period into the reaction vessel while maintaining a reflux temperature which is about 80°–200°C. After the above ingredients have been added, the reaction mixture is maintained at its reflux temperature for an additional 30 minutes to about 5 hours.

Any of the aforementioned solvents are suitable to prepare the aforementioned polymer utilized in this invention. Also, the aforementioned polymerization catalysts are used to form the polymer.

Generally, thermosetting resins are blended with the aforementioned polymer such as phenol/formaldehyde, urea/formaldehyde, melamine/formaldehyde, alkylated melamine/formaldehyde resins and benzoguanamine/-formaldehyde resins. One particularly useful group of resins are the alkylated melamine/formaldehyde resins and urea/formaldehyde. These preferred alkylated melamine/formaldehyde resins have 1–4 carbon atoms in the alkyl group and are those that are well known in the art. These resins are prepared by conventional techniques in which a lower alkyl alcohol, such as methanol, butanol, isobutanol, propanol, isopropanol, ethanol and the like, is reacted with the melamine/formaldehyde resin to provide pendent alkoxy groups. One preferred melamine resin used in this invention, because of its availability and since it forms a high quality coating composition, is a methylated melamine/formaldehyde.

Another particularly preferred thermosetting resin used with the above polymer used in this invention which gives a high quality coating composition is hexamethoxymethylol melamine.

Organic polyisocyanates can be used instead of the aforementioned thermosetting resin with the polymer to form a powder coating composition of this invention. Typical polyisocyanates include aliphatic, cycloaliphatic, alkaryl, aralkyl, heterocyclic and aryl polyisocyanates. The biuret polyisocyanate of the formula

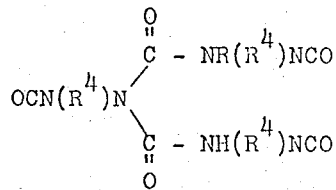

wherein $R^4$ is an aliphatic hydrocarbon group having 1–12 carbon atoms can also be used.

These polyisocyanates can be blocked with a blocking agent such as methyl ethyl ketoxime which reduces the reactivity of the polyisocyanate. This blocking agent is released under conventional baking temperatures and permits the isocyanate to react with the hydroxyl containing constituents with the polymer.

Epoxy hydroxy polyether resins can be also utilized in the novel coating composition of this invention. Typical epoxy resins as shown in Elbling U.S. Pat. No. 3,439,978, Winthrop et al. U.S. Pat. No. 3,102,043. Allen et al. U.S. Pat. No. 3,477,971 issued Nov. 11, 1969. Blends of polyester resins can also be utilized as shown in Taylor U.S. Pat. No. 3,382,295 issued May 7, 1968.

Pigments and Reflective Flake

The novel powder coating composition of this invention contains at least 0.1 and up to 5 percent by weight of a reflective flake that is uniformly dispersed with the colored polymeric powders. Any type of a reflective flake can be used, such as a metal flake like aluminum flake or mica flake coated with titanium dioxide. The resulting powder coating composition has excellent two-tone appearance.

Under some circumstances it may be desirable to disperse the reflective flake in the powder particle. This is accomplished by adding the flake to the pigmented polymer dispersion or solution before the powder is prepared.

Generally, colorants are used in the powder coating composition of this invention in amounts of 0.1–30 percent by weight of the polymer particles. For example, conventional dyes, organic pigments, lakes, and the like can be used. However, the colorant added to the powder particles should not render any resulting film formed from the powder particles opaque. As pointed out above, a 50 micron thick film must be able to transmit at least 10 percent of the light within the visible wavelength range of 4000–7000 Angstroms. Pigments that have a high hiding characteristics such as titanium dioxide and the like generally are not used and if used, can only be tolerated in minor amounts since these pigments do render resulting coating opaque. Typical pigments that can be used are for example iron oxide pigments, such as trans-oxide red and trans-oxide yellow; phthalocyanine pigments such as copper phthalocyanine and polyhalocopper phthalocyanine; indanthrone pigments such as "Indofast Blue"; thioindigoid such as "Thiofast Red"; perylene pigments such as "Perrindeau Violet" and "Perrindo Maroon"; carbazole dioxazine pigments such as "Indofast violet"; isoindolinone pigments such as "Irgazin yellow" and "Irgazin orange"; flavanthrone pigments such as "Indofast yellow" and anthanthrone pigments such as "Indofast orange."

Preparation of Powder Coating

The novel powder coating composition of this invention can be prepared by a variety of techniques. For example, the plasticizers and pigments can be blended with the polymer solution or emulsion. This mixture can then be sprayed into a vacuum evaporator which flashes off the solvent or the water and leaves spherical powder particles. Commercial spray drying equipment can be used for this technique.

A two-roll mill can also be used to disperse the pigment chips or pigment dispersion in the acrylic polymer dispersion or solution and the other additives. This composition is then ground to form the novel powder coating composition.

In another technique, the ingredients can be blended together, that is, the polymer solution or emulsion, the plasticizer and the pigments are passed into a vacuum extruder. The extruder is operated under a vacuum of 2–25 inches of mercury, preferably 10–15 inches of mercury, and the solvent or water is removed from the composition and 100 percent solids extrudate is produced. The extrudate is then reduced to a powder using conventional grinding equipment, for example, a pin disc mill, a fluid energy mill or a hammer mill can be used.

If cellulose acetate butyrate is used, it can be blended with the acrylic polymer and then mixed with plasticizer and mill base and ground. The cellulose acetate butyrate may be introduced through the mill base or through pigmented chips containing cellulose acetate butyrate.

About 0.1–2.0 percent by weight of finely divided silica can be blended with the novel powder coating composition of this invention to eliminate caking of the powder and improve its handling and spraying properties.

After grinding the powder is passed through a sieve to remove any large particles. Usually a 200–mesh sieve is used.

Different colored powders are then blended together to obtain the desired color along with the reflective flake to form the novel powder coating composition of this invention.

The novel powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which the voltage of 20 to 50 kilovolts is applied to the gun. The composition is applied in several passes to a thickness of 0.5–6 mils, preferably 2–3 mils, and then baked at 125°–200°C. for 5–15 minutes. Optionally, the finish may be sanded and then rebaked for 15–45 minutes at 125°–225°C. to provide a mirror-like finish.

Preferably, the novel coating composition of this invention is applied over a suitable treated and primed metal substrate. Typical alkyd primers or epoxy primers pigmented with iron oxide, carbon black, titanium dioxide and the like can be used. Also, the novel composition can be used directly over galvanized steel to form a durable coating. A sealer coat may be used over the primer coat to provide a particularly smooth and even surface over which the novel coating composition is then applied. Typical sealer compositions that can be used are disclosed in Rohrbacher U.S. Pat. No. 3,509,086, issued Apr. 28, 1970. An electrically conductive carbon black pigment can be added to the primer and/or sealer to make the surface conductive and promote uniform deposition of the powder while spraying.

Electrodeposited primers can be used on the metal substrate. Typical electrodeposited primer compositions have as the film-forming constituents about 50–95 percent by weight of a carboxylic acid polymer having an acid number of 5–200 and correspondingly about 5–50 percent by weight of a cross-linking agent. Generally, an electrically conductive sealer coat also is applied to these primers as indicated above.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylolated melamine formaldehyde, urea formaldehyde, benzoguanamine formaldehyde, melamine toluene sulfonamide resins; one preferred cross-linking agent is hexamethoxy methylol melamine. Other cross-linking agents such as, amines and other compatible hydroxyl terminated compounds can also be used.

The following examples illustrate the invention. All quantities are on a weight basis unless otherwise indicated.

EXAMPLE 1

Yellow pigment chips are prepared as follows:

| | Parts By Weight |
|---|---|
| Irgazine Yellow pigment | 42.21 |
| Cellulose acetate butyrate (38% butyryl content and a 2-second viscosity) | 42.21 |
| Acrylic copolymer (40% solids solution of methyl methacrylate/diethylamino ethyl methacrylate 99/1 in a 2:1 toluene/acetone solvent) | 2.11 |
| Coconut oil alkyd resin plasticizer | 13.47 |
| Total | 100.00 |

The above ingredients are charged into a two-roll mill and thoroughly blended together and form a product of finely divided chips.

Maroon pigment chips are prepared as follows:

| | Parts By Weight |
|---|---|
| Monastral magneta quinacridone maroon pigment | 40 |
| Cellulose acetate butyrate (38% butyryl content and a 2-second viscosity) | 50 |
| Butyl benzylphthalate | 10 |
| Total | 100 |

The above ingredients are charged into a two-roll mill and thoroughly blended together to form a product of finely divided maroon chips.

Red pigment chips are prepared as follows:

| | Parts By Weight |
|---|---|
| Iron oxide pigment (Midas Gold chip pigment) | 40 |
| Cellulose acetate butyrate (described above) | 50 |
| Butyl benzyl phthalate | 10 |
| Total | 100 |

The above ingredients are charged into a conventional two-roll mill and thoroughly blended together providing a product of finely divided chips.

A yellow powder coating composition is prepared as follows:

| | Parts By Weight |
|---|---|
| Portion 1 | |
| Didecyl phthalate | 5.26 |
| Dioctyl phthalate | 334.20 |
| L-522 silicone oil (low molecular weight silicone oil) | 27.20 |
| Portion 2 | |
| Cellulose acetate butyrate powder (having a 1 second viscosity and a butyryl content 50%) | 889.80 |
| Acrylic polymer particles (copolymer of methyl methacrylate/butyl methacrylate 75/25 having a weight average molecular weight of 81,000 and a number average molecular weight of 36,000) | 3209.80 |
| Yellow pigment chips (prepared above) | 1062.40 |
| Total | 5528.66 |

Portion 1 is mixed together, then Portion 2 is mixed together and then Portion 1 is added to Portion 2. The blend is then charged into a vacuum extruder which is held at about 150°–170°C. and the extrudate is quenched with water and taken from the water bath and charged into a pelletizer which forms the extrudate into small particles. These particles are fed into a pin disc mill which reduces the particle size to about 75–150 microns and then the particles are charged into a "Vortec" fluid energy mill and ground into small diameter particles and the powder is classified by passing the powder through a 200-mesh sieve (74 microns).

A maroon powder is prepared by blending the following ingredients:

| | Parts By Weight |
|---|---|
| Portion 1 | |
| Didecyl phthalate | 501.7 |
| Dioctyl phthalate | 166.7 |
| L-522 silicone oil (low molecular weight silicone oil) | 20.4 |
| Portion 2 | |
| Cellulose acetate butyrate powder (having a 1 second viscosity and a butyryl content 53%) | 583.4 |
| Acrylic polymer (described above) | 2437.6 |
| Maroon pigment chips (prepared above) | 841.0 |
| Total | 4550.8 |

Portion 1 is blended together, then Portion is blended together and then Portions 1 and 2 are thoroughly blended and the mixture is passed into a vacuum extruder, ground and classified according to the procedure described above to provide a maroon powder pigment.

A red powder coating is prepared as follows:

| | Parts By Weight |
|---|---|
| Portion 1 | |
| Didecyl phthalate | 1021.5 |
| Dioctyl phthalate | 317.5 |
| Silicone Oil (L-522, low molecular weight silicone oil) | 43.1 |
| Portion 2 | |
| Cellulose acetate butyrate (described above) | 1466.4 |

-Continued

| | Parts By Weight |
|---|---|
| Acrylic polymer particles (described above) | 4904.1 |
| Red pigment chips (prepared above) | 1284.8 |
| Total | 9037.4 |

Portion 1 is blended together, then Portion 2 is blended together and then Portions 1 and 2 are blended thoroughly and charged into an extruder, ground and classified according to the above procedure to form a red powder coating composition.

A blue powder coating composition is also prepared as follows:

| | Parts By Weight |
|---|---|
| Polymer solution (40% polymer solids of a methyl methacrylate/butyl acrylate copolymer ratio 75/25 having a number average molecular weight of about 45,000 in a solvent of toluene/methylethyl ketone 1:1 solvent ratio) | 145 |
| Cellulose acetate butyrate solution (20% solids in acetone of a cellulose acetate butyrate having a 50% butyryl content and a 1 second viscosity) | 120 |
| Diethyl phthalate | 6 |
| Didecyl phthalate | 12 |
| Total | 283 |

The above ingredients are thoroughly blended together to form a polymer solution.

The following ingredients are then blended together:

| | Parts By Weight |
|---|---|
| Polymer solution (prepared above) | 273.0 |
| Mill base (90% by weight of monastral blue dispersed in acrylic polymer solution) | 22.2 |
| Total | 292.2 |

The above ingredients are thoroughly blended together and spray dried in a closed container and then sifted through a 325 mesh sieve to provide a dry powder having a pigment/binder ratio of 2:96.

The following powder coating compositions were prepared by thoroughly mixing the powders together in the proportions shown in Table I. Each of the powder coating compositions 1–8 is applied to the phosphatized steel panel and to panels coated with a standard alkyd resin primer. A Gema Gun is used for application of the powder using about 35 kilovolts and aplying a coating. About 0.5 mil thick coating of an unpigmented clear, acrylic powder coating is then applied. The clear acrylic powder coating is prepared from the above polymer solution used to prepare the blue powder. The panels are then baked for 15 minutes at 175°C. and then sanded with a No. 600 grit paper. The final bake of 175°C. for 30 minutes is then given to the panels.

Each of the resulting panels have excellent appearance, good gloss, good physical properties and have good craze-free and print-free temperatures and acceptable cold crack resistance.

| Coating Composition | 1 | 2 | 3 | 4 | 5 | 6 | 7 | 8 |
|---|---|---|---|---|---|---|---|---|
| | (Parts By Weight) | | | | | | | |
| Aluminum Flake (particle size below 200 mesh sieve) | 2.0 | 1.0 | 1.0 | 1.0 | 1.0 | 1.0 | 0.5 | 0.5 |
| Red Powder | — | — | 49.5 | — | 49.5 | — | 42.5 | 42.5 |
| Yellow Powder | 49 | 42.6 | — | — | 49.5 | 33.0 | — | 57.0 |
| Maroon Powder | 49 | 56.4 | 49.5 | 33.0 | — | — | 57.0 | — |
| Blue Powder | — | — | — | 66.0 | — | 66.0 | — | — |
| Total | 100.0 | 100.0 | 100.0 | 100.0 | 100.0 | 100.0 | 100.0 | 100.0 |
| Film Thickness (mils) | 2.3 | 2.8 | 3.0 | 3.2 | 2.8 | 2.9 | 3.0 | 3.7 |
| Gloss at 20° | 50 | 67 | 54 | 54 | 55 | 73 | 47 | 73 |

I claim:

1. A powder coating composition consisting essentially of finely divided particles having a particle size of 1–75 microns of 1. 95.0–99.9 percent by weight, based on the weight of the powder coating composition, of a blend of at least two differently colored powder particles capable of adhering to one another to form a continuous film wherein the powder particles consist essentially of 70–99.9 percent by weight of a film-forming binder and 0.1–30 percent by weight of colorant particles and when the powder particles are formed into a film about 50 microns thick transmit at least 10 percent of the light of the visible wave length of 4000–7000 Angstroms; and 2. 0.1–5.0 percent by weight, based on the weight of the powder coating composition of individual aluminum flake pigment particles having a particle size below 200 mesh;

wherein the film-forming binder of the colored particles is a thermoplastic polymer consisting essentially of A. 40–90 percent by weight of an acrylic polymer selected from the group consisting of a homopolymer of an alkyl methcarylate having 1–3 carbon atoms in the alkyl group;

a polymer of an alkyl methacrylate having 1–4 carbon atoms in the alkyl group and containing at least 50 percent by weight of methyl methacrylate, a polymer of an alkyl methacrylate and an alkyl acrylate having 1–12 carbon atoms in the alkyl groups and containing at least 70 percent by weight methyl methacrylate, a graft copolymer of an alkyl methacrylate and an alkyl acrylate having 1–12 carbon atoms in the alkyl groups;

the acrylic polymer has a number average molecular weight of about 20,000–70,000;

B. 5–40 percent by weight of cellulose ester having a viscosity of 0.1–12 seconds measured at 25°C. according to ASTM–D–1343, and a butyryl content of 30–60 percent by weight;

C. 5–35 percent by weight of an organic plasticizer;

wherein the film-forming constituents have a melt viscosity below 75,000 poises measured at 160°C. and the powder particles have a glass transition temperature of about 30°–60°C., and wherein the colorant particles are selected from the group consisting of trans iron oxide red pigment, trans iron oxide yellow pigment, phthalocyanine pigments, indanthrone pigments, thioindigoid pigments, perylene pigments, carbazole dioxane pigments, isoindolinone pigments, flavanthrone pigments, anthanthrone pigments and mixtures thereof.

2. The powder coating composition of claim 1 in which the particle size is 30–50 microns, the acrylic polymer has a number average molecular weight of about 40,000–60,000, the film-forming constituents have a melt viscosity of 5,000–40,000 poises and the powder particles have a glass transition temperature of 30°–45°C.

3. The powder coating composition of claim 2 in which the film-forming constituents consist essentially of 55–75 percent by weight of a copolymer of 70–90 percent by weight methyl methacrylate and 10–30 percent by weight of butyl methacrylate;

20–30 percent by weight of cellulose acetate butyrate having a butyryl content of 45–55 percent by weight and a viscosity of 1–2 seconds;

5–25 percent by weight of a plasticizer selected from the group consisting of an alkyl phthalate ester having 2–10 carbon atoms in the alkyl group, a polyester and a mixture of the phthalate ester and the polyester.

4. The powder coating composition of claim 2 in which the copolymer consists of 75 percent by weight methyl methacrylate and 25 percent by weight butyl methacrylate;

the cellulose acetate butyrate has a 53 percent butyryl content and a viscosity of 1 second;

the plasticizer is a blend of phthalate ester of didecyl phthalate and diethyl phthalate.

5. The powder coating composition of claim 3 in which the plasticizer is a 2:1 blend of didecyl phthalate and di-2-ethyl hexyl phthalate.

6. The powder coating composition of claim 3 in which the plasticizer is a 4:1 blend of ethylene glycol adipate benzoate polyester and neopentyl glycol adipate benzoate polyester.

7. The powder coating composition of claim 2 in which the film-forming constituents consist essentially of polymethyl methacrylate, cellulose acetate butyrate having a butyryl content of 38 percent and a viscosity of 2 seconds, and a plasticizer blend of didecyl phthalate and diethyl phthalate.

8. The powder coating composition of claim 2 in which the film-forming constituents consist essentially of a copolymer of methyl methacrylate and butyl methacrylate;

cellulose acetate butyrate having a butyryl content of 45–55 percent by weight and a viscosity of 1 second, and a plasticizer blend of didecyl phthalate and diethyl phthalate.

9. The powder coating composition of claim 2 in which the film-forming constituents consist essentially of 55–75 percent by weight of an acrylic polymer of methyl methacrylate, butyl methacrylate and methacrylic acid;

20–30 percent by weight of cellulose acetate butyrate having a butyryl content of 53 percent by weight and a viscosity of 1 second, and 5–25 percent by weight of a blend of polymeric plasticizers of ethylene glycol adipate benzoate and neopentyl glycol adipate benzoate.

* * * * *